(12) United States Patent
Mak

(10) Patent No.: US 10,679,165 B1
(45) Date of Patent: *Jun. 9, 2020

(54) SYSTEM AND METHOD FOR DETERMINING LOSS RESULTING FROM DATA PRIVACY AND SECURITY BREACH

(71) Applicant: Nationwide Mutual Insurance Company, Columbus, OH (US)

(72) Inventor: Eric C. Mak, Hilliard, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,423

(22) Filed: May 15, 2019

Related U.S. Application Data

(63) Continuation of application No. 14/483,680, filed on Sep. 11, 2014, now Pat. No. 10,339,482.

(51) Int. Cl.
*G06Q 10/06* (2012.01)
(52) U.S. Cl.
CPC .................. *G06Q 10/0635* (2013.01)
(58) Field of Classification Search
CPC .......................................... G06Q 10/00–50/00
(Continued)

(56) References Cited

U.S. PATENT DOCUMENTS

| | | | |
|---|---|---|---|
| 8,516,597 B1 * | 8/2013 | Sharma ................. | G06F 21/577 705/38 |
| 2002/0120558 A1 * | 8/2002 | Reid .................... | G06Q 40/025 705/38 |

(Continued)

OTHER PUBLICATIONS

Acquisti, Alessandro, Allan Friedman, and Rahul Telang. "Is there a cost to privacy breaches? An event study." ICIS 2006 Proceedings (2006): 94. (Year: 2006).

(Continued)

*Primary Examiner* — Alan S Miller
(74) *Attorney, Agent, or Firm* — Morgan, Lewis & Bockius LLP

(57) ABSTRACT

A system and method for calculating loss data associated with a data privacy and security breach event occurring within an organization based on collected data. Data describing a number of individuals affected by the event; an estimated number of hours spent by the organization on managing the event; enrollment by individuals affected by the event in a credit monitoring service; an estimated amount spent on communications within the organization relating to the event; an estimated number of hours of loss of productivity by the organization; an estimated credit monitoring service call center volume; an estimated amount spent on computer forensics; and an estimated amount spent on legal counsel is received. Data describing (i) an amount spent by the organization in managing the event; (ii) an amount spent by the organization in notifying individuals affected by the event; (iii) an amount spent by the organization on the credit monitoring service; (iv) an amount spent on loss of productivity; (v) an amount spent on loss of assets; and (vi) an amount spent on credit monitoring service call center activities is calculated. Data describing a total loss amount associated with the event is calculated based on the received data received and the calculations.

12 Claims, 5 Drawing Sheets

(58) Field of Classification Search
USPC .............................................. 705/7.11–7.42
See application file for complete search history.

(56) References Cited

U.S. PATENT DOCUMENTS

| | | | | |
|---|---|---|---|---|
| 2004/0163007 | A1* | 8/2004 | Mirkhani | G06F 11/008 |
| | | | | 714/1 |
| 2005/0066195 | A1* | 3/2005 | Jones | G06F 21/577 |
| | | | | 726/4 |
| 2009/0326987 | A1* | 12/2009 | Roudaut | G06Q 20/102 |
| | | | | 705/4 |
| 2011/0173122 | A1* | 7/2011 | Singhal | G06Q 20/32 |
| | | | | 705/44 |
| 2013/0097659 | A1* | 4/2013 | Das | G06F 21/629 |
| | | | | 726/1 |
| 2015/0205954 | A1* | 7/2015 | Jou | G06F 21/316 |
| | | | | 726/22 |

OTHER PUBLICATIONS

Ponemon Institute, "2013 Cost of Data Breach Study: Global Analysis", May 2013.

Martin, Clemens, Amina Kadry, and Ghada Abu-Shady. "Quantifying the financial impact of it security breaches on business processes." Privacy, Security and Trust (PST), 2014 Twelfth Annual International Conference on. IEEE, 2014.

* cited by examiner

Primary Loss Magnitude

Total # of Affected States:
Time Spent - TC Captured:
Time Spent:
Blue Dollar Total Spend:
# of Credit Monitoring Offered:
% Enrollment:
Estimated Loss of Productivity:
# of Customers Lost:
$ Amount of Loss:

Total # of Affected Individuals:
Time Spent - Other:

Green Dollar Total Spend:

# of Credit Monitoring Redeemed:
# of Complaints Filed After Notification:

Customer Churn?:

# of Accounts Lost:
Negative Media?:

FIG. 1A

Privacy Event # (YYYYMMDD-999): [ ] (Sample only)

Event type: [ ]

| # | Primary loss expense items | | |
|---|---|---|---|
| 1 | Estimated number of Affected Individuals | - | |
| 2 | ERT's estimated hours spent on managing the event (end-to-end) | - | |
| 3 | ERT's blue dollar spent on managing the event ($100/hr.) | | $ - |
| 4 | Green dollar spent on breach notification (printing and mailing $2/each) | | $ - |
| 5 | Credit Monitoring Service (CMS) Enrollment Rate (Normal range 10% - 25%) | 0% | |
| 6 | Call Center Call Volume (Range 3% - 8%) | 0.00% | |
| 7 | Green dollar spent on Credit Monitoring Service (CMS) (e.g. $32/each) | | $ - |
| 8 | Green dollar spent on ERT communication (e.g. bridge calls) | | $ - |
| 9 | Business' estimated hours on loss productivity | 0 | |
| 10 | Business' blue dollar spent on loss of productivity ($100/hr.) | | $ - |
| 11 | Business' green dollar spent on loss of assets | | $ - |
| 12 | Green dollar spent on Call Center ($6/call) | | $ - |
| 13 | 3rd Party Computer Forensics (Green) | | |
| 14 | Outside Counsel (Green) | | |
| 15 | (Other) | | |
| 16 | (Other) | | |
| 17 | (Other) | | |
| 18 | Blue dollar spent: | $ - | |
| 19 | Green dollar spent: | $ - | |
| 20 | Total estimated loss / expenses (Blue + Green): | | $ - |

SYSTEM AND METHOD FOR DETERMINING LOSS RESULTING FROM DATA PRIVACY AND SECURITY BREACH

CROSS REFERENCE TO RELATED APPLICATIONS

This application is a continuation of U.S. application Ser. No. 14/483,680 filed on Sep. 11, 2014 the entirety of which is hereby incorporated by reference in its entirety.

FIELD OF THE INVENTION

The invention relates to estimating loss resulting from a data privacy and security breach event.

BRIEF SUMMARY OF THE INVENTION

In accordance with embodiments of the present invention, loss data associated with a data privacy and security breach event occurring within an organization is calculated based on collected data. Data describing a number of individuals affected by the event; an estimated number of hours spent by the organization on managing the event; enrollment by individuals affected by the event in a credit monitoring service; an estimated amount spent on communications within the organization relating to the event; an estimated number of hours of loss of productivity by the organization; an estimated credit monitoring service call center volume; an estimated amount spent on computer forensics; and an estimated amount spent on legal counsel is received. Data describing (i) an amount spent by the organization in managing the event; (ii) an amount spent by the organization in notifying individuals affected by the event; (iii) an amount spent by the organization on the credit monitoring service; (iv) an amount spent on loss of productivity; (v) an amount spent on loss of assets; and (vi) an amount spent on credit monitoring service call center activities is calculated. Data describing a total loss amount associated with the event is calculated based on the received data received and the calculations.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIGS. 1A and 1B are exemplary computer interfaces that may be used to implement the methods of the present invention;

DETAILED DESCRIPTION OF THE PREFERRED EMBODIMENTS

Figure 2:
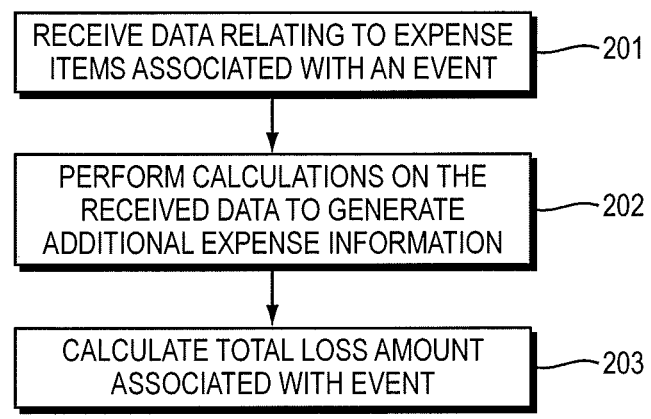
FIG. 2 is a flow chart illustrating an exemplary method of the present invention.

The systems and methods described herein enable privacy and information risk management professionals to conduct accurate loss estimates associated with a data privacy and security breach event. A data privacy and security breach event may involve leakage of data (e.g., an individual discloses information to a party who is not authorized to receive it); unauthorized access or exceeding authorized access (e.g., an individual accesses information he is not authorized to access); fraud; identity theft; computer malware; mis-emailing or mis-mailing (e.g., electronic or paper communication is sent to individuals for whom the mail was not intended); office break-in; computer phishing; stolen/lost computers; stolen/lost electronic storage media; and an application available via a website. Because the systems and methods involve use of common criteria in estimating loss, risk management teams may communicate more effectively and efficiently, thereby enhancing consistency and collaboration. At least certain embodiments described herein provide a method for consistent data collection and a comprehensive set of line items related to a breach event from which to choose, given the various variables and assumptions that may be applicable to a particular business risk environment. Thus, the present invention is useful in a complex business and system structure for assessing risk scenarios.

FIG. 1A is an exemplary user interface to a computer-based application that may be used to receive input relating to, and calculate losses resulting from, an actual breach event. At the commencement of a breach event, at least some of the data required to calculate loss may be known and can be input into the system. As time passes following a breach event, more data, and more accurate data, may be collected and input into the computer system, which may then calculate the loss. In some embodiments, a user interface such as shown in FIG. 1A may not be used to input any or all of the data; in such embodiments, the relevant data may be obtained directly from a computer system through a computer interface.

Referring to FIG. 1A, an end user may input certain information. Such information may be actual, or estimated based on historical data, or hypothetical (i.e., pending receipt of actual data relating to the breach) and may include:

Number of states impacted by the event;
Number of individuals impacted by the event;
Amount of time spent on managing the event (e.g., including individuals involved with event management for an organization and individuals who are not part of the event management team);
Number of credit monitoring services offered;
Number of credit monitoring services redeemed;
Number of complaints filed by consumers after notification of the breach event;
Estimated loss of productivity of the organization in responding to an event;
Customer churn;
Number of customers lost by organization as a result of the event;
Number of accounts lost by organization as a result of the event;
Negative media/reputational damage; and
Dollar amount lost as result of the event (which may be calculated based on one or more of the foregoing inputs).

FIG. 1B is another exemplary interface that may be used to receive input from an end user relating to a data privacy and security breach event. This interface may be used, for example, to simulate breach scenarios and calculate loss resulting from the same. It provides flexibility in terms of variables and assumptions that can be used as inputs. Some of the data input to this interface, or data calculated based on such inputs, may be used as inputs to the interface of FIG. 1A. In this interface, exemplary primary loss expense items are illustrated. In this example, the following data may be input into the interface:

Estimated number of individuals affected by the event;
Estimated hours spent on managing the event (end-to-end);
Blue Dollars spent on managing the event (e.g., assuming $100/hr.);
Green Dollars spent on breech notification (e.g., printing and mailing, $2/each);
Credit Monitoring Service Enrollment Rate (e.g., normal range 10%-25%);
Credit Monitoring Service Call Center Volume (e.g., range 3%-8%);
Green Dollars spent on Credit Monitoring Service (e.g., $32/each);
Green Dollars spent on communication among the event response team within an organization (e.g., bridge calls);
Business' estimated hours on loss of productivity;
Business' blue dollar spent on loss of productivity (e.g., $100/hr.);
Business' green dollar spent on loss of assets;
Green dollar spent on Credit Monitoring Service Call Center (e.g., $6/call);
Third Party Computer Forensics; and
Outside legal counsel.

Reference made herein to "Green Dollars" spent refers to amounts paid by an organization that has experienced an event to a third party. "Blue Dollars" spent refers to amounts incurred internally within an organization that has experienced an event. As will be understood by those skilled in the art, these references are exemplary only; other nomenclature may be used to refer to internal and external expenses within the scope of the present invention.

The calculations performed using the inputs of the interface of FIG. 1B are now described. Row 3 (i.e., blue dollars spent on managing the event) can be calculated by multiplying the number input in Row 2 (i.e., estimated hours spent on managing the event) by a dollar per hour figure (e.g., $100/hr). Row 4 (i.e., green dollars spent on notification) can be calculated by multiplying the number input in Row 1 (i.e., estimated number of affected individuals) by an estimated printing and mailing cost (e.g., $2/individual). Row 7 (i.e., green dollars spent on credit monitoring service) can be calculated by multiplying the number input in Row 1 (i.e., estimated number of affected individuals) by the number input in Row 5 (i.e., credit monitoring service enrollment rate) by a dollar figure (e.g., $32). Row 10 (i.e., blue dollars spent on loss of productivity) can be calculated by multiplying the estimated hours on loss of productivity (Row 9) by a dollar per hour figure (e.g., $100/hr). Row 12 (i.e., green dollars spent on call center) can be calculated by multiplying the number input in Row 1 (i.e., estimated number of affected individuals) by the number input in Row 6 (i.e., call center volume) by a dollar figure (e.g., $6). A total of green dollars and blue dollars spent may be calculated, and a grand total of green and blue dollars spent may also be determined.

In the preferred embodiment, both the interfaces of FIGS. 1A and 1B are programmed to accept input into the data fields in accordance with predefined rules. For example, such data fields may be programmed to accept only numerical values, and not letters or symbols. Also, other data fields are programmed to be read-only. Such fields do not accept input from the end user and, instead, are programmed to auto-calculate based on data from other fields. Thus, for example, with reference to FIG. 1A, the Total Time Spent field is read-only and sums the values entered in the "Time Spent–TC Captured" and the "Time Spent–Other" fields (i.e., Time Spent–TC Captured+Time Spent–Other=Total Time Spent). By way of further example, the "Enrollment %" field is auto-calculated using the following logic, and displayed in percentage format: (# Credit Monitoring Redeemed/# Credit Monitoring Offered)×100.

Further, the input for some fields may be pulled directly from other systems, rather than being input by an end user. Thus, for example, the systems described herein with regard to determining loss resulting from data privacy and security breach may be incorporated into a larger Event Management System ("EMS"), which is designed to manage the end-to-end lifecycle of an event. Such a system may include a computer application that allows end users to input their time spent in responding to an event. Such information could be auto-populated in, e.g., the "Time Spent–TC Captured" field of the interface of FIG. 1A. Other fields shown in the interface of FIG. 1A may be auto-populated based on data captured, calculated or inputted in other systems and computer applications that are part of the EMS.

Both the controls and rules that are in place regarding the inputting and acceptance of data into the interfaces of FIGS. 1A and 1B, as well as the auto-population of data fields based on calculations made based on data in other fields, or captured from other systems within the EMS, allow for consistency and efficiency, as well as east of interaction with other systems.

Additional data may be input and used in connection with estimating the loss associated with a data privacy and security breach event. As is also apparent, the solution is not limited to the number of individuals impacted by the event or the number of compromised records. The expenses associated with loss events may differ depending on the magnitude of the loss, even for the same type of loss event, due to economies of scale involved in responding to the event. The methodologies of the present invention take this factor into account. Still further, the approach of the present invention allows for a flexible approach to estimating loss in this regard, recognizing that using a single cost figure for all events does not result in an accurate estimate, given that the values for the variables are different for each type of event and each specific event.

An exemplary flow chart is described with reference to FIG. 2. In step 201, data describing expense items associated with a data privacy and security breach event is received. In step 202, calculations are performed, using the received data, to generate data describing additional expense information associated with the event. In step 203, using the data received in step 201 and the data calculated in step 202, data describing a total loss amount associated with the event is calculated.

Figure 3:
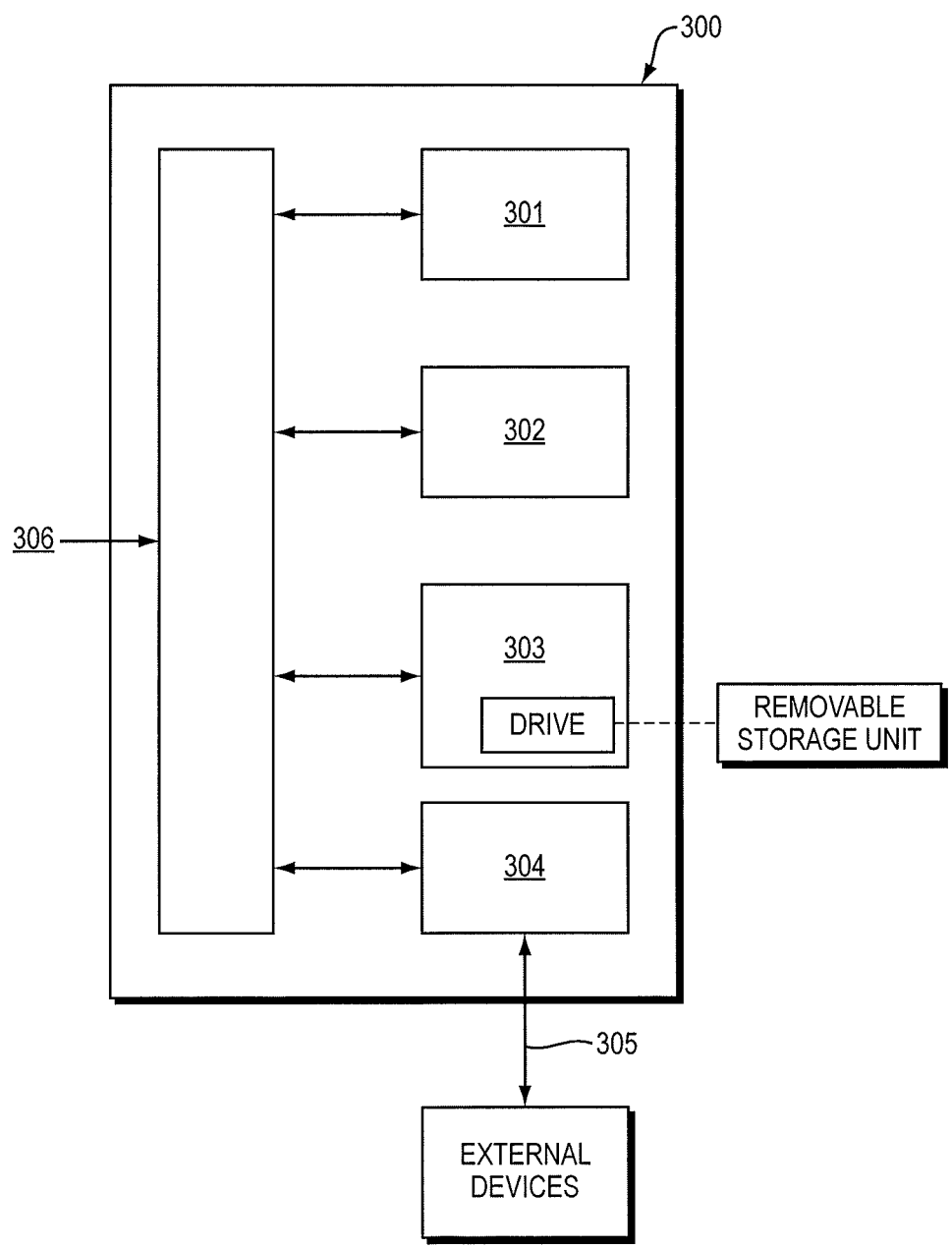
FIG. 3 is an exemplary computer system that may be used in connection with an embodiment of the present invention.
Figure 4:
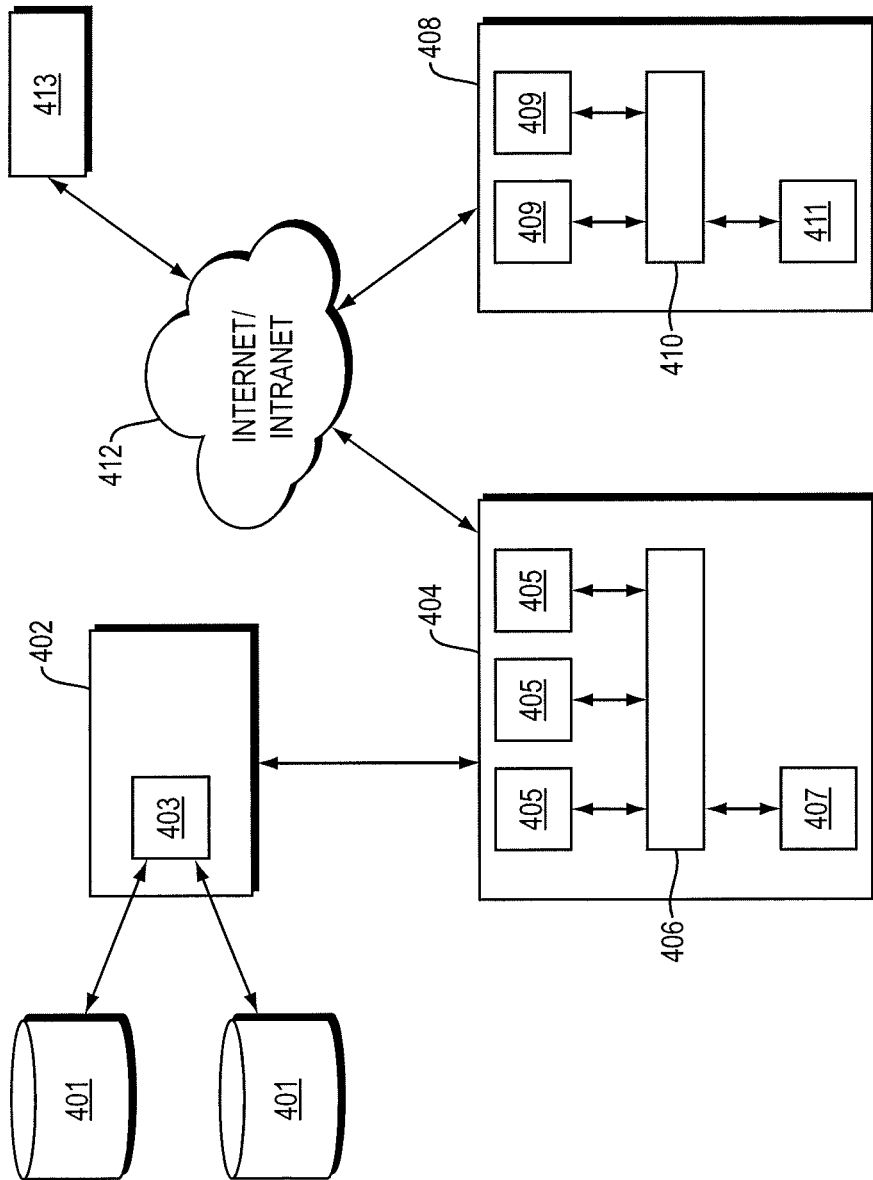
FIG. 4 is an alternative exemplary computer system that may be used in connection with an embodiment of the present invention.

Exemplary computer systems, including computer hardware and software, that may be used to implement the methods of the present invention are now described with reference to FIGS. 3 and 4. The calculations performed in connection with the invention are performed by executing a computer software application using a computer processor. The inputs for the calculations can be received through human input into an appropriate computer interface. Alternatively, in some embodiments, the inputs may be received from another computer system.

Computer system 300 comprises hardware, including a computer processor, as described more fully herein, that is specifically programmed using code (i.e., computer readable instructions stored in a non-transitory computer readable medium) to carry out the steps of the methods and calculations described herein.

Computer system 300 includes one or more processors 301. Processor 301 may be any type of processor, including but not limited to a special purpose or general purpose digital signal processor. Processor 301 may be connected to a communication infrastructure 306 (for example, a bus or network).

Computer system 300 also includes one or more memories 302, 303. Memory 302 may be random access memory (RAM). Memory 303 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data.

In alternative implementations, memory 303 may include other similar means for allowing computer programs or other instructions to be loaded into computer system 300. Such means may include, for example, a removable storage unit and an interface. Examples of such means may include a removable memory chip (such as an EPROM, or PROM, or flash memory) and associated socket, and other removable storage units and interfaces which allow software and data to be transferred from removable storage unit to computer system 300. Alternatively, the program may be executed and/or the data accessed from the removable storage unit, using the processor 301 of the computer system 300.

Computer system 301 may also include a communication interface 304. Communication interface 304 allows software and data to be transferred between computer system 300 and external devices. Examples of communication interface 304 may include a modem, a network interface (such as an Ethernet card), and a communication port, by way of example. Software and data transferred via communication interface 304 are in the form of signals, which may be electronic, electromagnetic, optical, or other signals capable of being received by communication interface 304. These signals are provided to communication interface 304 via a communication path 305. Communication path 305 carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to computer system 300. However, these terms may also include signals (such as electrical, optical or electromagnetic signals) that embody the computer program disclosed herein.

Computer programs are stored in memory 302 and/or memory 303. Computer programs may also be received via communication interface 304. Such computer programs, when executed, enable computer system 300 to implement the present invention as discussed herein. Accordingly, such computer programs represent controllers of computer system 300. Where the invention is implemented using software, the software may be stored in a computer program product and loaded into computer system 300 using removable storage drive, hard disk drive, or communication interface 304, to provide some examples.

In some embodiments, the methods are carried out by a system that employs a client/server architecture. Such exemplary embodiments are described as follows with reference to FIG. 4. The data that may be used as an input to the system, and the outputs to the system, may be stored in one or more databases 401. Database server(s) 402 may include a database services management application 403 that manages storage and retrieval of data from the database(s) 401. The databases 401 may be relational databases; however, other data organizational structure may be used without departing from the scope of the present invention.

One or more application server(s) 404 are in communication with the database server 402. The application server 404 communicates requests for data to the database server 402. The database server 402 retrieves the requested data. The application server 404 may also send data to the database server 402 for storage in the database(s) 401. The application server 404 comprises one or more processors 405, non-transitory computer readable storage media 407 that store programs (computer readable instructions) for execution by the processor(s) (e.g., to perform the calculations described herein), and an interface 406 between the processor(s) 405 and computer readable storage media 407. The application server 404 may store the computer programs referred to herein (i.e., the computer programs that are used in connection with collecting data and calculating loss amounts), as described more fully herein.

To the extent data and information is communicated over the Internet or an Intranet, one or more Internet/Intranet servers 408 may be employed. The Internet/Intranet server 408 also comprises one or more processors 409, computer readable storage media 411 that store programs (computer readable instructions) for execution by the processor(s), and an interface 410 between the processor(s) 409 and computer readable storage media 411. The Internet/Intranet server 408 is employed to deliver content that can be accessed through the communications network 412, e.g., by an end user employing computing device 413. When data is requested through an application, such as an Internet browser, the Internet/Intranet server 408 receives and processes the request. The Internet/Intranet server 408 sends the data or application requested along with user interface instructions for displaying a user interface on device 413.

The computers referenced herein are specially programmed to perform the functionality described herein.

The non-transitory computer readable storage media (e.g., 407 or 411) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may be combined. Unless specifically set forth herein, the terms "a", "an" and "the" are not limited to one element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A computer implemented method for collecting and calculating loss data associated with an event occurring within an organization, based on collected data, comprising:
   (A) receiving, via an interface of a computer based application, data inputted into at least one data field, the data describing at least one of: (i) a number of individuals affected by the event; (ii) an estimated number of hours spent by the organization on managing the event; (iii) enrollment by individuals affected by the event in a credit monitoring service; (iv) an estimated amount spent on communications within the organization relating to the event; (v) an estimated number of hours of loss of productivity by the organization; (vi) an estimated credit monitoring service call center volume; (vii) an estimated amount spent on computer forensics; and (viii) an estimated amount spent on legal counsel, wherein the at least one data field is configured to accept the received data in accordance with predefined rules; and
   (B) calculating, via a processor of the computer based application, data describing an amount spent by the organization, wherein the calculated data is determined by at least one of the received data or new data; and
   (C) calculating, via the processor, data describing a total loss amount associated with the event based on the data received in the at least one data field and the calculated data; and
   (D) auto-populating the at least one data field based on input received from an electronic device.

2. A system comprising:
memory operable to store at least one program; and
at least one processor communicatively coupled to the memory, in which the program, when executed by the processor, causes the processor to perform a method for calculating loss data associated with an event occurring within an organization, based on collected data, the method comprising:
   (A) receiving, via an interface of a computer based application, data inputted into at least one data field, the data describing at least one of: (i) a number of individuals affected by the event; (ii) an estimated number of hours spent by the organization on managing the event; (iii) enrollment by individuals affected by the event in a credit monitoring service; (iv) an estimated amount spent on communications within the organization relating to the event; (v) an estimated number of hours of loss of productivity by the organization; (vi) an estimated credit monitoring service call center volume; (vii) an estimated amount spent on computer forensics; and (viii) an estimated amount spent on legal counsel, wherein the at least one data field is configured to accept the received data in accordance with predefined rules; and
   (B) calculating, via the at least one processor, data describing an amount spent by the organization, wherein the calculated data is determined by at least one of the received data or new data; and
   (C) calculating, via the processor, data describing a total loss amount associated with the event based on the data received in the at least one data field and the calculated data; and
   (D) auto-populating the at least one data field based on input received from an electronic device.

3. A non-transitory computer readable medium storing instructions which, when executed by a computer processor, cause the computer processor to perform a method for calculating loss data associated with an event occurring within an organization, based on collected data, the method comprising:
   (A) receiving, via an interface of a computer based application, data inputted into at least one data field, the data describing at least one of: (i) a number of individuals affected by the event; (ii) an estimated number of hours spent by the organization on managing the event; (iii) enrollment by individuals affected by the event in a credit monitoring service; (iv) an estimated amount spent on communications within the organization relating to the event; (v) an estimated number of hours of loss of productivity by the organization; (vi) an estimated credit monitoring service call center volume; (vii) an estimated amount spent on computer forensics; and (viii) an estimated amount spent on legal counsel, wherein the at least one data field is configured to accept the received data in accordance with predefined rules; and
   (B) calculating, via the computer processor, data describing an amount spent by the organization, wherein the calculated data is determined by at least one of the received data or new data; and
   (C) calculating, via the computer processor, data describing a total loss amount associated with the event based on the data received in the at least one data field and the calculated data; and
   (D) auto-populating the at least one data field based on input received from an electronic device.

4. The computer implemented method of claim 1, wherein receiving, via the interface of the computer based application, includes receiving from both the user interface and the computer interface.

5. The computer implemented method of claim 1, wherein auto-populating the at least one data field results in at least one other data field that is programmed to be read-only.

6. The system of claim 2, wherein receiving, via the interface of the computer based application, includes receiving from both the user interface and the computer interface.

7. The system of claim 2, wherein auto-populating the at least one data field results in at least one other data field that is programmed to be read-only.

8. The method of claim 3, wherein receiving, via the interface of the computer based application, includes receiving from both the user interface and the computer interface.

9. The method of claim 3, wherein auto-populating the at least one data field results in at least one other data field that is programmed to be read-only.

10. The computer implemented method of claim 1, wherein the amount spent by the organization is the amount spent on one of: (i) managing the event; (ii) notifying individuals affected by the event; (iii) a credit monitoring service; (iv) loss of productivity; (v) loss of assets; and (vi) on credit monitoring service call center activities.

11. The system of claim 2, wherein the amount spent by the organization is the amount spent on one of: (i) managing the event; (ii) notifying individuals affected by the event; (iii) a credit monitoring service; (iv) loss of productivity; (v) loss of assets; and (vi) on credit monitoring service call center activities.

12. The method of claim 3, wherein the amount spent by the organization is the amount spent on one of: (i) managing the event; (ii) notifying individuals affected by the event; (iii) a credit monitoring service; (iv) loss of productivity; (v) loss of assets; and (vi) on credit monitoring service call center activities.

\* \* \* \* \*